United States Patent [19]

Nelson

[11] Patent Number: 5,710,605

[45] Date of Patent: Jan. 20, 1998

[54] REMOTE CONTROL UNIT FOR CONTROLLING A TELEVISION AND VIDEOCASSETTE RECORDER WITH A DISPLAY FOR ALLOWING A USER TO SELECT BETWEEN VARIOUS PROGRAMMING SCHEDULES

[76] Inventor: Rickey D. Nelson, 5232 Madella St., Haltom City, Tex. 76117

[21] Appl. No.: 587,109

[22] Filed: Jan. 11, 1996

[51] Int. Cl.[6] ...................................... A04N 5/44
[52] U.S. Cl. .............................. 348/734; 348/3; 348/906; 379/104
[58] Field of Search .................. 348/3, 734, 906, 348/552; 359/146, 148, 145, 143; 379/102, 104, 105; 340/825.69, 825.72, 825.36; 345/169; H04N 5/44

[56] References Cited

U.S. PATENT DOCUMENTS

| 5,410,326 | 4/1995 | Goldstein | 348/734 |
| 5,410,367 | 4/1995 | Zahari et al. | 348/906 |
| 5,532,754 | 7/1996 | Young et al. | 348/734 |

FOREIGN PATENT DOCUMENTS

| 5308542A | 11/1993 | Japan | H04N 5/00 |
| 9615615 | 5/1996 | WIPO | H04M 11/04 |

Primary Examiner—Victor R. Kostak
Assistant Examiner—Jeffrey S. Murrell

[57] ABSTRACT

A universal remote control unit for controlling a television and videocassette recorder including a data input mechanism securable to a telephone line for receiving signals from an external supplier representing television programing schedule items; a display mechanism for displaying television programing schedule items and television and videocassette operating functions in a hierarchy of textual and scrollable selection lists; a user-operable selector mechanism for allowing a user to scroll through the lists and then select television programing schedule items or television and videocassette functions; another user-operable selector mechanism for allowing a user to generate billing signals signifying a payment to be made in response to the receipt of the television programming schedule items from the external supplier; a data output mechanism securable to a telephone line for transmitting the billing signals representing a payment made to the external supplier; a processor mechanism for controlling operations; and a transmitter mechanism responsive to the processor mechanism for generating and transmitting via free space remote scheduling signals for subsequent receipt by the television and videocassette recorder for scheduling and controlling each of their operations.

3 Claims, 4 Drawing Sheets

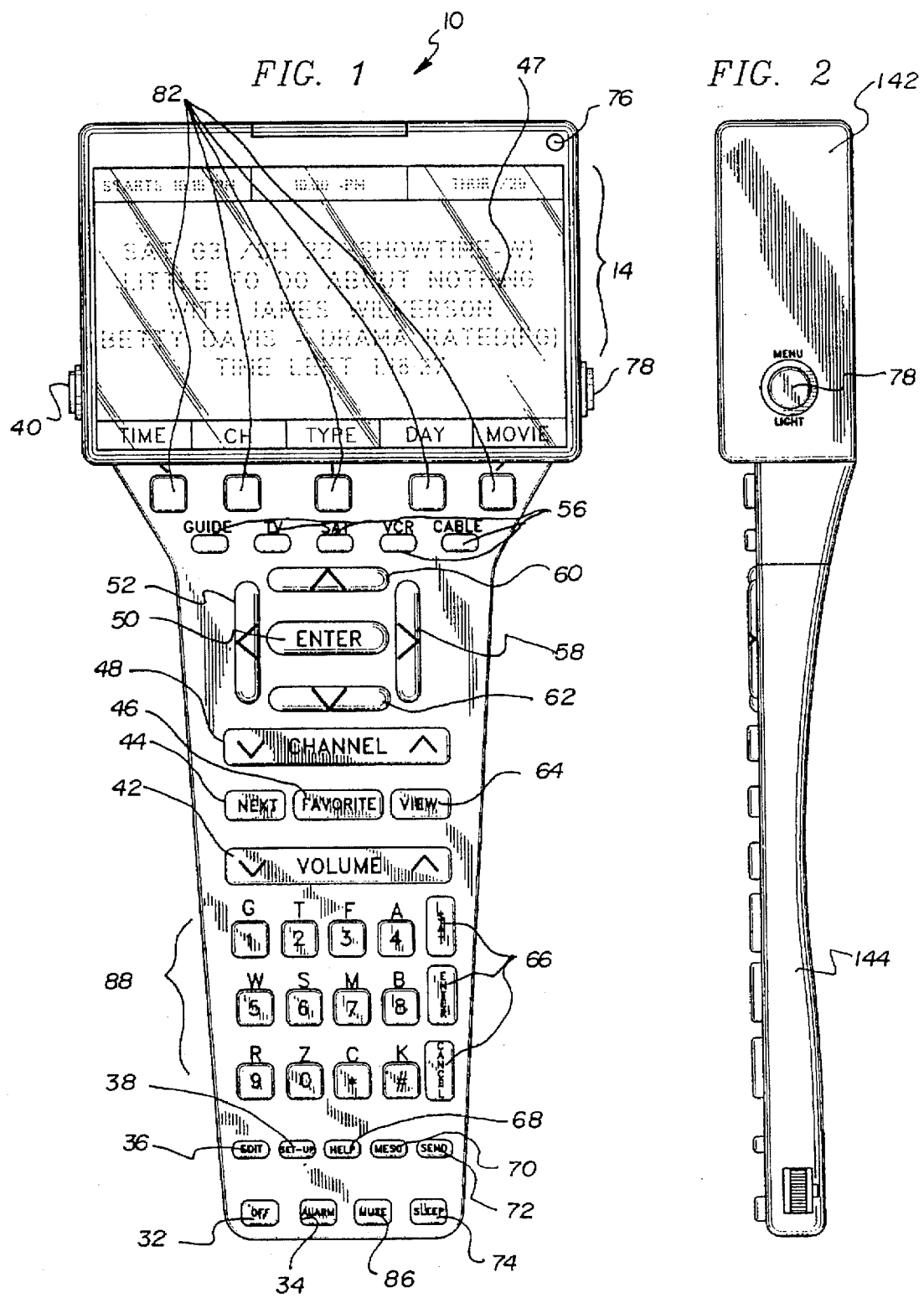

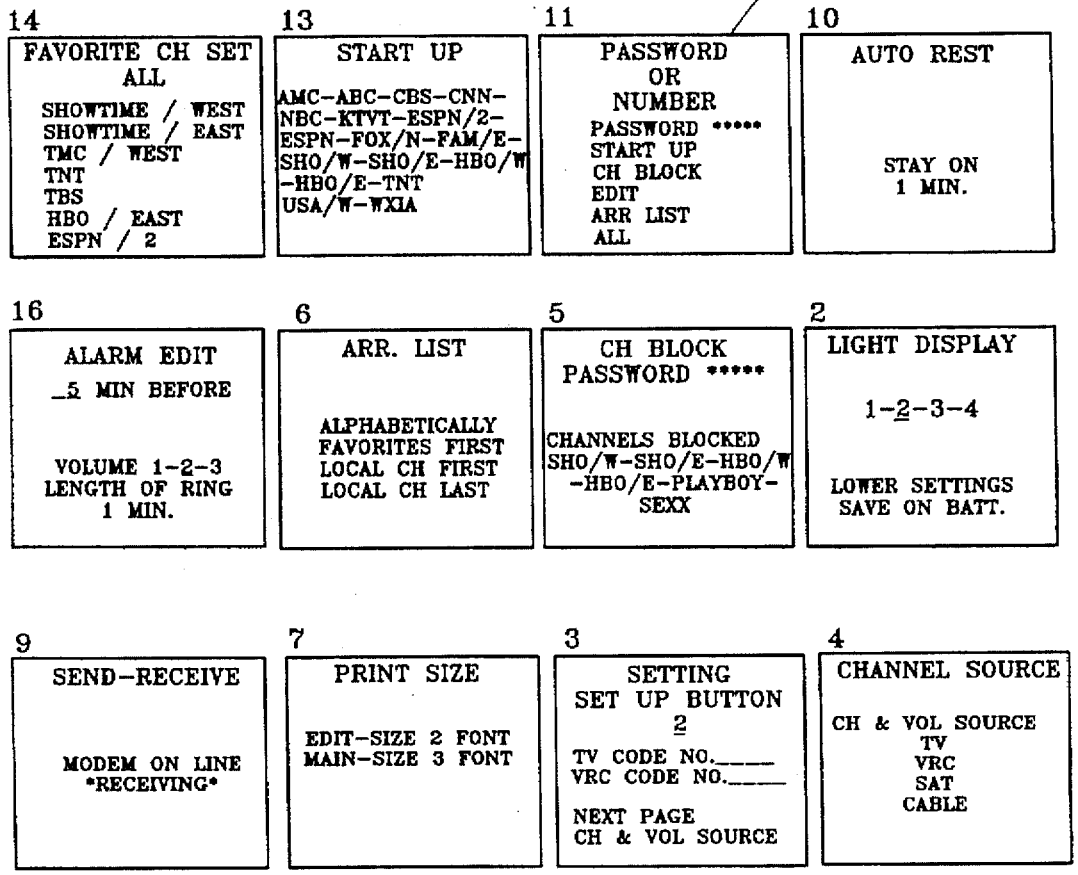

REMOTE CONTROL UNIT FOR CONTROLLING A TELEVISION AND VIDEOCASSETTE RECORDER WITH A DISPLAY FOR ALLOWING A USER TO SELECT BETWEEN VARIOUS PROGRAMMING SCHEDULES

BACKGROUND OF THE INVENTION

1. Field of the Invention

The present invention relates to a universal remote control unit and more particularly pertains to controlling television and videocassette recorder functions from a remote location with a universal remote control unit.

2. Description of the Prior Art

The use of universal remote controls is known in the prior art. More specifically, universal remote controls heretofore devised and utilized for the purpose of remotely controlling functions of electronic devices are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 342,259 to Darbee et al. discloses a universal remote control. U.S. Pat. No. 4,774,511 to Rumbolt et al. discloses a universal remote control unit. U.S. Pat. No. 5,031,046 to Brüggemann discloses a remote controlled device for a television set. U.S. Pat. No. 5,214,622 to Nemoto et al. discloses an information display apparatus.

While these devices fulfill their respective, particular objective and requirements, the aforementioned patents do not describe a universal remote control unit that allows television programming schedules to be received from an external supplier and paid for through the use of an on-board modem, and wherein the television programming schedules are in a format that can be used to remotely program a television, videocassette recorder, satellite antenna, externally-provided cable television service or combination thereof.

In this respect, the universal remote control unit according to the present invention substantially departs from the conventional concepts and designs of the prior art, and in doing so provides an apparatus primarily developed for the purpose of controlling television and videocassette recorder functions from a remote location.

Therefore, it can be appreciated that there exists a continuing need for new and improved universal remote control unit which can be used for controlling television and videocassette recorder functions from a remote location. In this regard, the present invention substantially fulfills this need.

SUMMARY OF THE INVENTION

In the view of the foregoing disadvantages inherent in the known types of universal remote controls now present in the prior art, the present invention provides an improved universal remote control unit. As such, the general purpose of the present invention, which will be described subsequently in greater detail, is to provide a new and improved universal remote control unit and method which has all the advantages of the prior art and none of the disadvantages.

To attain this, the present invention essentially comprises, in combination, a modem that is securable to a telephone line for receiving a plurality of signals from an external supplier. The signals represent a plurality of television programing schedule items. A timing mechanism is included for keeping track of a current day and time. A display mechanism is included for displaying the current day and time and for further displaying television programing schedule items and television and videocassette operating functions in a hierarchy of textual and scrollable selection lists. A first user-operable selector mechanism is provided for allowing a user to scroll through the lists and then select one of the television programming schedule items. A second user-operable selector mechanism is provided for allowing a user to scroll through the lists and then select one of the television and videocassette functions. A third user-operable selector mechanism is provided for generating a plurality of billing signals signifying a payment to be made in response to the receipt of the television program schedule items from the external supplier. The modem is then used to transmit the billing signals to the external supplier. Furthermore, a fourth user-operable selector mechanism is provided for allowing a user to designate one of the program schedule items as a favorite program.

A processor mechanism is included and coupled to the data input mechanism, the timing mechanism, the selector mechanisms, and the modem. The processor mechanism is responsive to the first user-operable selector mechanism for generating a television programming scheduling signal when a television programming data item is selected. The processor mechanism is further responsive to the second user-selector means for generating a function control signal when a television and videocassette function is selected. A memory mechanism is included and coupled to the processor mechanism for storing the television programming scheduling signals, the function control signals, and the billing signals.

In addition, an infrared transmitter mechanism is provided and coupled to the processor mechanism. The transmitter mechanism is responsive to receipt of one of the television programming scheduling signals from the processor mechanism for generating and transmitting via free space one of a plurality of remote scheduling signals for subsequent receipt by the television and videocassette recorder for scheduling each of their operations. The infrared transmitter mechanism is further responsive to the receipt of one of the function control signals from the processor means for generating and transmitting via free space one of a plurality of remote control signals for subsequent receipt by the television and videocassette recorder for controlling each of their operations. Lastly, an alarm mechanism is included and is responsive to the processor means for generating an alarm at a predetermined time to signify when the user's favorite program is about to begin.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved universal remote control unit which has all the advantages of the prior art universal remote controls and none of the disadvantages.

It is another object of the present invention to provide a new and improved universal remote control unit which may be easily and efficiently manufactured and marketed.

It is a further object of the present invention to provide a new and improved universal remote control unit which is of durable and reliable construction.

An even further object of the present invention is to provide a new and improved universal remote control unit which is susceptible of a low cost of manufacture with regard to both materials and labor, and which accordingly is then susceptible of low prices of sale to the consuming public, thereby making such a universal remote control unit economically available to the buying public.

Still yet another object of the present invention is to provide a new and improved universal remote control unit which provides in the apparatuses and methods of the prior art some of the advantages thereof, while simultaneously overcoming some of the disadvantages normally associated therewith.

Even still another object of the present invention is to provide a new and improved universal remote control unit for controlling local television, videocassette recorder, satellite antenna, and externally-provided cable television functions from a remote location.

Lastly, it is an object of the present invention to provide a new and improved universal remote control unit comprising data input means securable to a telephone line for receiving a plurality of signals from an external supplier representing a plurality of television programming schedule items; display means for displaying television programming schedule items and television and videocassette operating functions and in a hierarchy of textual and scrollable selection lists; first user-operable selector means for allowing a user to scroll through the lists and then select one of the television programming schedule items; second user-operable selector means for allowing a user to scroll through the lists and then select one of the television and videocassette functions; third user-operable selector means for generating a plurality of billing signals signifying a payment to be made in response to the receipt of the television program schedule items from the external supplier; data output means securable to a telephone line for transmitting the billing signals to the external supplier; processor means coupled to the data input means, the timing means, the selector means, and the data output means, the processor means responsive to the first user-operable selector means for generating a television programming scheduling signal when a television programming data item is selected, the processor means further responsive to the second user-selector means for generating a function control signal when a television and videocassette function is selected; memory means coupled to the processor means and used for storing the television programming scheduling signals, the function control signals, and the billing signals; and transmitter means responsive to receipt of one of the television programming scheduling signals from the processor means for generating and transmitting via free space one of a plurality of remote scheduling signals for subsequent receipt by the television and videocassette recorder for scheduling each of their operations, the infrared transmitter means further responsive to the receipt of one of the function control signals from the processor means for generating and transmitting via free space one of a plurality of remote control signals for subsequent receipt by the television and videocassette recorder for controlling each of their operations.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front plan view of the preferred embodiment constructed in accordance with the principles of the present invention.

FIG. 2 is a side-elevational view of the preferred embodiment of the present invention.

FIG. 7 is an example of some of the hierarchical menus that are accessible through depression of the EDIT key of the present invention.

The same reference numerals refer to the same parts through the various Figures.

DESCRIPTION OF THE PREFERRED EMBODIMENT

Figures 3, 4:
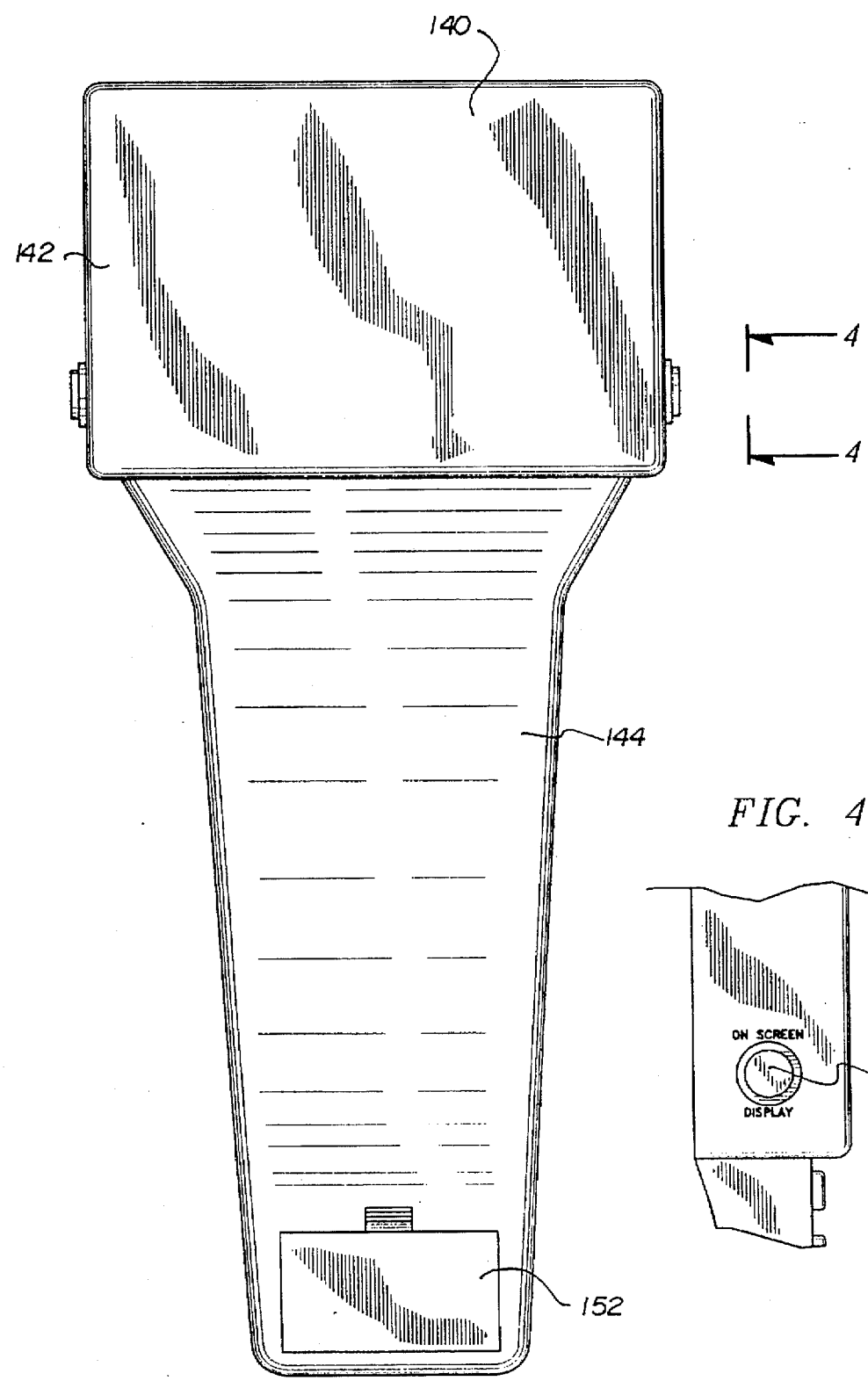
FIG. 3 is a rear plan view of the preferred embodiment of the present invention.
FIG. 4 is a view of the present invention taken along the line 4-4 of FIG. 3.

With reference now to the drawings, and in particular, to FIG. 1 thereof, the preferred embodiment of the new and improved universal remote control unit embodying the principles and concepts of the present invention and generally designated by the reference number 10 will be described.

The preferred embodiment of the present invention comprises a plurality of components. In their broadest context, such components include a data input and output mechanism, a timing mechanism, a display mechanism, a selector mechanism, a processor mechanism, a memory mechanism, a transmitter mechanism, and an alarm mechanism. Such components are individually configured and correlated with respect to each other to provide the intended function of controlling a television, a videocassette recorder, or combination thereof. In addition, the television receiver may be used to control overall program scheduling functions, externally-provided cable television functions, and satellite television and local antenna functions. Thus, the present invention essentially serves as a remote electronic controller and "TV GUIDE."

Specifically, the present invention includes a conventional electronic modem 12. The modem is securable to a telephone line. The modem receives a plurality of electrical signals over the telephone line from an external supplier. Such an external supplier could be a business specifically catering to a user's television program needs. These external signals represent a plurality of television programming schedule items 14, as displayed per FIG. 1. Such items include the name of the television program, its start and stop time, and other ancillary information such as a brief description of the television program. The television schedule can comprise a day's worth or even up to a month's worth of television programming. Such television programming covers satellite, cable, and conventional broadcast methods.

The present invention also includes an electronic timing circuit 16. The timing circuit is used for keeping track of a current day and time. The timing circuit also includes a calendar function for keeping track of future days, months, and even years.

Also provided is a display circuit 20 formed of a conventional electronic liquid crystal display. The display circuit is used for displaying the current date and time of the timing circuit. Furthermore, the display circuit is used for displaying television programming schedule items 14 and conventional television and videocassette operating functions such as ON/OFF, FAST FORWARD, PLAY, RECORD, etc. The display circuitry displays the television programming schedule items and television and videocassette operating functions in a hierarchy of textual and scrollable selection lists 22. Moreover, the lists allow access to a plurality of menus 24. The menus provide information and allow selections to be made.

The present invention includes a keypad 30 for allowing a user manual control of the television, the videocassette recorder, and even a household satellite receiving dish. The keypad includes four categories of keys for controlling operations of a television and videocassette recorder from a remote location. The first set of keys allows a user to scroll through the lists and then select one of the television programming schedule items 14. The second set of keys allows a user to scroll through the lists and then select one of the television and videocassette functions. The third set of keys allows a user to generate a plurality of billing signals that signify a payment to be made in response to the receipt of television program scheduling items from the external supplier. Typically, such billing signals represent a user's credit card number. These billing signals are then transmitted over modem 12 to the supplier.

Specifically, the keys of the present invention include an OFF BUTTON 32 that is used for turning the television or the videocassette recorder on and off. An ALARM BUTTON 34 is used to set an audible or visual alarm indicating the start of a user's selected program. An EDIT KEY 36 is used to perform on-screen editing. A hierarchical menu of on-screen editing functions of the present invention is shown in FIG. 7. The top level menu provides access to lower level menus for performing desired actions. In addition, a SET-UP KEY 38 allows the present invention to work with another television and videocassette recorder. A ON TV BUTTON 40 allows information on the display 20 to be displayed on the television screen. A VOLUME KEY 42 is used for controlling the volume of the television. A NEXT BUTTON 44 is used to see what program will be shown on at a future date. A FAVORITE CHANNEL BUTTON 46 provides access to a list of selected favorite networks or programs. A CHANNEL UP AND DOWN KEY 48 allows channels to be toggled up and down across the display 20. An ENTER KEY 50 is used for confirming selections when programming the present invention. A LEFT ARROW KEY 52 moves the cursor 47 on the screen to the left. A plurality of DEVICE ACTIVATION BUTTONS 56 are used to turn on the television, satellite dish, videocassette recorder, or cable access. When these buttons are activated on, they are backlit. A RIGHT ARROW KEY 58 moves the cursor to the right. An UP ARROW KEY 60 moves the cursor up on the display. A DOWN ARROW KEY 62 moves the cursor down on the display. A VIEW BUTTON 64 is used for displaying on-screen information such as a name of a movie, how much time is left, a network name, etc. Three CONTROL BUTTONS 66 are used for controlling satellite receiver operations. A HELP KEY 68 is used for providing on-screen help. A MESSAGE KEY 70 provides messages from the broadcast networks or television programs. A SEND or UPDATE BUTTON 72 provides television program schedule updates through use of the built-in modem. A SLEEP KEY 74 will provide an on-screen timer display and allow a user to set a time to shut-down the videocassette recorder or television. A LOW BATTERY WARNING LIGHT 76 is used for providing an indication of when the present invention is low on power. A MENU LIGHT switch 78 is used for allowing the display 12 to be backlit when desired. Five FUNCTION BUTTONS 82 are provided to allow displayed information on the lists to be readily changed through a one-key action. In association with the FUNCTION BUTTONS, words 84 on the lower extent of the display will be displayed when the different keys 82 are pressed. These words change with respect to the type of menu displayed. Lastly, a MUTE BUTTON 86 is used for turning the sound or volume off on the television.

The present invention includes memory circuitry. The memory circuitry is formed of conventional read-only memory 100 and random access memory 102. The memory circuitry is used for storing the television programming scheduling signals, the function control signals, and the billing signals entered by the use for present or later use.

A standard microprocessor 100 is provided and is coupled to the timing circuit 16, the keypad 30, the memory circuitry 100, 102, and the modem via a universal asynchronous receiver transmitter (UART) 112. The processor mechanism is also coupled to the display circuitry 20 via a display control circuit 116. The processor mechanism is used to generate a television programming signal when a television programming data item is selected through the keypad. The processor mechanism is further used for generating function control signals that can control a television, a videocassette recorder, or combination thereof when a television or videocassette function is selected through the keypad.

In addition, the present invention includes a conventional infrared transmitter circuit 120. The transmitter circuit 120 is responsive to the receipt of the television programming signals from the processor 110 for generating and transmitting via free space a plurality of remote scheduling signals for subsequent receipt by the television or videocassette recorder. Such remote scheduling signals are used for scheduling the operations of the television and videocassette recorder in a conventional manner. The infrared transmitter circuit is further responsive to the receipt of the function control signals from the processor means for generating and transmitting via free space one of a plurality of remote control signals for subsequent receipt by the television or videocassette recorder. Such remote control signals are used for controlling operations of the television and videocassette recorder in a standard manner.

A conventional radio receiver 122 is provided as a supplementary item to the modem 12. The radio receiver is coupled to and controlled by the processor 110. The radio receiver allows television programming signals to be received via free space from a remote supplier. The processor controls when the modem or radio receiver is active. The radio reciever also allows internally generated control signals to be transmitted to a remote location for controlling an external device such as a local satellite antenna.

The present invention includes an audible or visual alarm mechanism 130. The alarm mechanism is coupled to the processor mechanism. The alarm mechanism generates an alarm at a predetermined time to signify when the user's favorite program is about to begin.

Figure 5:
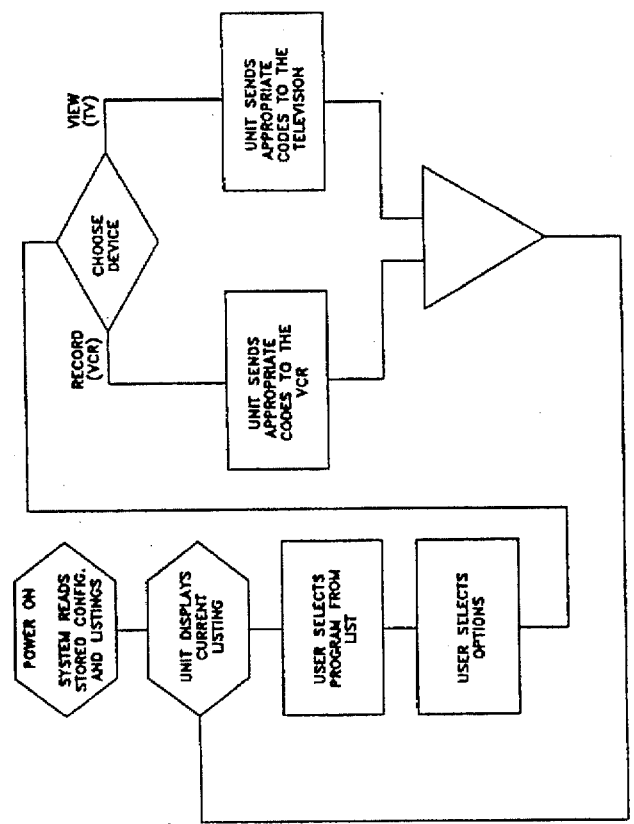
FIG. 5 is a functional flow diagram of operations of the present invention.
Figure 6:
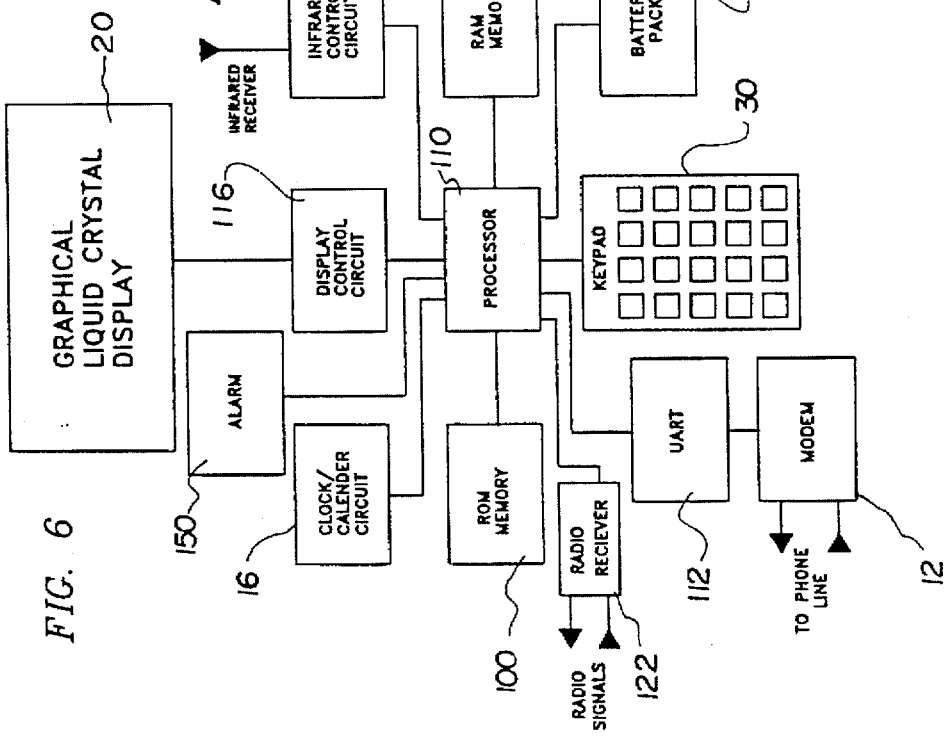
FIG. 6 is a functional block diagram of the preferred embodiment of the present invention.

A flow diagram depicting the operation of the present invention is shown in FIG. 5. In operation, the present invention is first activated. The present invention then loads its system and default setting in preparation for use. Currently stored program listings are then accessible by a user. The user can scroll through the menus of the lists and make desired selections. The user can then select which remote device to control.

The present invention is encased in a hand-holdable rigid plastic console 140. The console has a generally box-shaped upper extent 142 and a frustroconical lower extent 144 that allows a user a firm grip. The present invention is powered by a battery pack 150 that is accessible through a door 152 on the housing. Preferably, the size of the display 20 of the present invention is about 4 inches in length by about 2½ inches in width to create an aspect ratio that allows easy viewing of text by even those with degraded eyesight.

The present invention is a television and videocassette recorder remote control unit which will perform all the functions of the currently offered typical universal remote control unit while serving as a program guide as well. The present invention is formed like any other remote control console and can be easily held in the hand. However, the upper area of the console is enlarged and features a display screen. This unit also incorporates a small modem to facilitate a necessary telephone connection for receiving the program schedule information as well as transmitting a code such as a credit card number for indicating a payment for receipt of the program schedule information. A modest charge for listings and the modem connection will be offset since the separate purchase of a program listing will not be necessary. The present invention features a display screen that is backlit and has large printed text for greater visibility. The present invention is especially valuable to the elderly since to the elderly in this regard.

The present invention is used much like a conventional computer and has menus which enable the user to select the type of programming to be listed. Television and videocassette recorder control is also included and one need only highlight any listed function and press enter to have that function activated on the videocassette recorder.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A universal remote control unit for controlling a television and videocassette recorder, the television and videocassette recorder being adapted to perform a function upon receipt of a remote control signal, the universal remote control comprising, in combination:

data input means securable to a telephone line for receiving a plurality of signals from an external supplier representing a plurality of television programming schedule items;

timing means for keeping track of a current day and time;

display means for displaying the current day and time and for further displaying television programming schedule items and television and videocassette operating functions in a hierarchy of textual and scrollable selection lists;

first user-operable selector means for allowing a user to scroll through the lists and then select one of the television programming schedule items;

second user-operable selector means for allowing a user to scroll through the lists and then select one of the television and videocassette functions;

third user-operable selector means for generating a plurality of billing signals signifying a payment to be made in response to the receipt of the television program schedule items from the external supplier;

data output means securable to the telephone line for transmitting the billing signals to the external supplier;

fourth user-operable selector means for allowing a user to designate one of the program schedule items as a favorite program;

processor means coupled to the data input means, the timing means, the first user-operable selector means, the second user-operable selector means, the third user-operable selector means, the fourth user-operable selector means, and the data output means, the processor means responsive to the first user-operable selector means for generating a television programming scheduling signal when a television programming data item is selected, the processor means further responsive to the second user-selector means for generating a function control signal when the television and videocassette functions are selected;

memory means coupled to the processor means for storing the television programming scheduling signals, the function control signals, and the billing signals;

infrared transmitter means coupled to the processor means responsive to receipt of one of the television programming scheduling signals from the processor means for generating and transmitting via free space one of a plurality of remote scheduling signals for subsequent receipt by the television and videocassette recorder for scheduling each of their operations, the infrared transmitter means further responsive to the receipt of one of the function control signals from the processor means for generating and transmitting via free space one of a plurality of remote control signals for subsequent receipt by the television and videocassette recorder for controlling each of their operations; and alarm means coupled to and responsive to the processor means for generating an alarm at a predetermined time to signify when the user's favorite program is about to begin.

2. A universal remote control unit for controlling a television and videocassette recorder, the television and videocassette recorder adapted to perform a function upon receipt of a remote control signal, the universal remote control comprising:

data input means securable to a telephone line for receiving a plurality of signals from an external supplier representing a plurality of television programming schedule items;

display means for displaying television programming schedule items and television and videocassette operating functions and in a hierarchy of textual and scrollable selection lists;

first user-operable selector means for allowing a user to scroll through the lists and then select one of the television programming schedule items;

second user-operable selector means for allowing a user to scroll through the lists and then select one of the television and videocassette functions;

third user-operable selector means for generating a plurality of billing signals signifying a payment to be made in response to the receipt of the television program schedule items from the external supplier;

data output means securable to a telephone line for transmitting the billing signals to the external supplier;

processor means coupled to the data input means, the timing means, the selector means, and the data output means, the processor means responsive to the first user-operable selector means for generating a television programming scheduling signal when a television programming data item is selected, the processor means further responsive to the second user-selector means for generating a function control signal when the television and videocassette functions are selected;

memory means for storing the television programming scheduling signals, the function control signals, and the billing signals; and transmitter means responsive to receipt of one of the television programming scheduling signals from the processor means for generating and transmitting via free space one of a plurality of remote scheduling signals for subsequent receipt by the television and videocassette recorder for scheduling each of their operations, transmitter means further responsive to the receipt of one of the function control signals from the processor means for generating and transmitting via free space one of a plurality of remote control signals for subsequent receipt by the television and videocassette recorder for controlling each of their operations.

3. A universal remote control unit for controlling a television and videocassette recorder, the television and videocassette recorder adapted to perform a function upon receipt of a remote control signal, the universal remote control comprising:

data input means securable to a telephone line for receiving a plurality of signals from an external supplier representing a plurality of television programming schedule items;

display means for displaying television programming schedule items and television and videocassette operating functions and in a hierarchy of textual and scrollable selection lists;

first user-operable selector means for allowing a user to scroll through the lists and then select one of the television programming schedule items;

second user-operable selector means for allowing a user to scroll through the lists and then select one of the television and videocassette functions;

third user-operable selector means for generating a plurality of billing signals signifying a payment to be made in response to the receipt of the television program schedule items from the external supplier;

data output means securable to a telephone line for transmitting the billing signals to the external supplier;

processor means coupled to the data input means, the timing means, the selector means, and the data output means, the processor means responsive to the first user-operable selector means for generating a television programming scheduling signal when a television programming data item is selected, the processor means further responsive to the second user-selector means for generating a function control signal when the television and videocassette functions are selected;

memory means for storing the television programming scheduling signals, the function control signals, and the billing signals;

transmitter means responsive to receipt of one of the television programming scheduling signals from the processor means for generating and transmitting via free space one of a plurality of remote scheduling signals for subsequent receipt by the television and videocassette recorder for scheduling each of their operations, the transmitter means further responsive to the receipt of one of the function control signals from the processor means for generating and transmitting via free space one of a plurality of remote control signals for subsequent receipt by the television and videocassette recorder for controlling each of their operations;

fourth user-operable selector means for allowing a user to designate one of the program schedule items as a favorite program; and alarm means coupled responsive to the processor means for generating an alarm at a predetermined time to signify when the user's favorite program is about to begin.

* * * * *